United States Patent [19]
Kightlinger et al.

[11] 3,883,933
[45] May 20, 1975

[54] LOCKING APPAREL CLAMP

[75] Inventors: Neal B. Kightlinger; Rufus W. Woodall, both of Gainesville, Ga.

[73] Assignee: Gainesville Manufacturing Co., Inc., Gainesville, Ga.

[22] Filed: Apr. 15, 1974

[21] Appl. No.: 460,977

[52] U.S. Cl.................. 24/250 R; 269/212; 269/238
[51] Int. Cl............................................. A44b 21/00
[58] Field of Search .......... 269/212, 229, 237, 238; 223/1, 96; 24/248 R, 248 B, 248 E, 248 L, 248, FS, 250 R

[56] References Cited
UNITED STATES PATENTS
2,592,903  4/1952  Jackson .............................. 269/237
3,374,976  3/1968  Kurlander et al. ................. 24/250 R
3,656,212  4/1972  Velte.................................... 24/250 R Primary Examiner—G. V. Larkin
Attorney, Agent, or Firm—Lowe, King & Price

[57] ABSTRACT

An apparatus for clamping fabric or apparel such as trousers comprises a stationary support member vertically mounted on a wheeled platform, and an adjustable clamp member pivotally supported by the support member, the two members forming the jaws of a clamp. An outwardly extending cam formed on the adjustable clamp member extends toward the stationary support member to cooperate with an actuation rod for moving the clamp member. The rod is pivotally mounted on the support member to slidingly engage the surface of the cam. As the actuation rod is operated to slide downwardly along the cam surface, the adjustable clamp member rotates with respect to the stationary support member closing the jaws of the clamp. A pawl is formed on the actuation rod and positioned to engage a ratchet assembly mounted on the platform to lock the adjustable clamp member to hold the fabric or apparel. A foot operated release moves the ratchet out of engagement with the pawl to unlock the adjustable clamp member, thereby providing a positive release of the jaws of the clamp.

16 Claims, 3 Drawing Figures

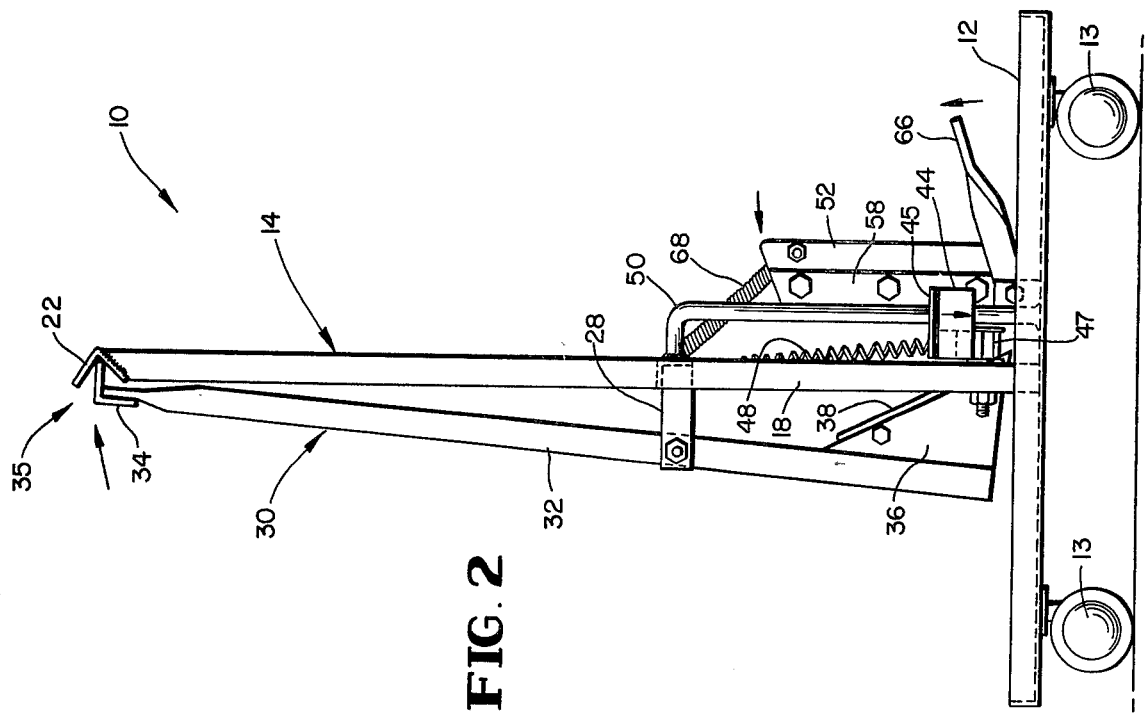
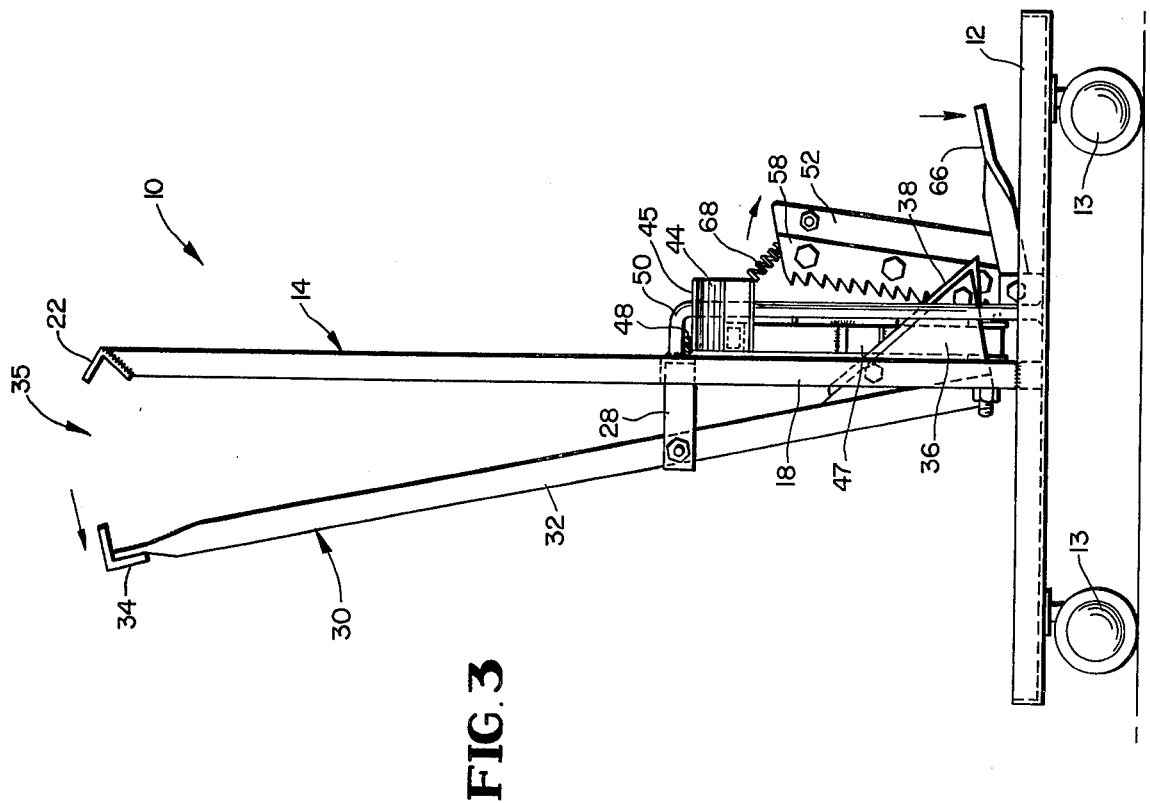

3,883,933

LOCKING APPAREL CLAMP

FIELD OF THE INVENTION

The present invention relates generally to an apparatus for clamping fabric or apparel, and more particularly to an apparatus for clamping fabric or apparel, the apparatus having jaws which are securely lockable against the fabric or apparel, and positively releasable therefrom.

DESCRIPTION OF THE PRIOR ART

In the manufacture of apparel, and particularly trousers, large amounts of fabric are transported among work stations in a manufacturing facility where the fabric is cut and sewn in stages to eventually form the finished garment.

In a typical manufacturing facility, trousers are not cut and sewn individually. A large number of plies of fabric, for example, one hundred plies, is first cut to a required size with a suitable cutting apparatus. A bundle of the cut fabric is then transported, usually on a wheeled cart, from station-to-station where each seamstress performs a particular operation.

For example, at one work station, each pair of partially formed trousers in the bundle, suspended in a clamping apparatus from the ends of the legs of the trousers, is modified by a sewing operator to form pockets. In the operation, the operator separates one pair of partially formed trousers from the bundle and, while a portion remains clamped in the clamping apparatus with the bundle, the pockets are formed. The operator then proceeds to separate out the remaining trousers, one at a time, and adds pockets to each pair. Meanwhile, all the trousers remain clamped in the apparatus in readiness to move to the next operator. The bundle of pairs of trousers is not removed from the apparatus until all sewing and related procedures in this stage of manufacture have been completed. Subsequently, the bundle is removed from the apparatus by unclamping the jaws thereof, and the pairs of trousers are then separated and transferred to an inspection station, for example.

In the prior art device, at the lower end of the adjustable clamp member, a cam is formed which extends toward the stationary support member. An actuation rod, pivotally mounted on the stationary support member, is positioned to slide tangentially along the surface of the cam as the rod is operated to thereby close the jaws of the clamp. The jaws of the clamp are locked in place against fabric or apparel positioned therein due to friction existing between a serrated face of the cam and the actuation rod.

In operation, the operator closes the jaws of the clamp by stepping down on the actuation rod. As the actuation rod slides along the serrated surface of the cam, the adjustable clamp member is caused to rotate with respect to the support member so that the jaws of the clamp close. The serrations formed on the surface of the cam, interacting with the actuation rod, cause the jaws of the clamp to become locked.

While this arrangement is operable, it has the disadvantage of requiring the operator to press the actuation rod with a fairly large amount of force when setting the clamp. This is required to overcome the resistance due to the friction between the serrated surface of the cam and the actuation rod. In addition, in order to release the jaws of the clamp, the operator must pry the actuation rod up from engagement with the cam surface, again requiring a large amount of force. Because the operators are very often women, the large forces required present a very heavy physical burden on them. Furthermore, this is time consuming and cuts into valuable production time. Finally, the serrated surface of the cam tends to wear rapidly causing the locking mechanism to slip making it difficult and even more time consuming to get the clamp to set. The jaws of the clamp when so worn, occasionally release without warning, dropping the clamped fabric or apparel to the floor.

OBJECTS OF THE INVENTION

Accordingly, it is one object of the present invention to provide a new and improved fabric clamp.

It is another object of the present invention to provide a new and improved fabric clamp, the jaws of which are easily closed and locked against fabric or apparel by an operator.

It is yet another object of the present invention to provide a new and improved fabric clamp having a locking mechanism which securely locks and positively releases the jaws of the clamp under the control of an operator.

It is still another object of the present invention to provide a new and improved fabric clamp which includes a locking mechanism which does not wear out with continued use.

It is one other object of the present invention to provide a new and improved locking fabric clamp which is conveniently operated and easily manufactured.

BRIEF DESCRIPTION OF THE INVENTION

Briefly, in accordance with this invention, the foregoing and other objects are in one aspect obtained by the provision of a fabric clamping apparatus comprising a stationary support member which is vertically mounted on a wheeled platform, a support bracket on said support member to which is pivotally mounted an adjustable clamp member, the two members forming a set of jaws and an improved locking mechanism. This mechanism includes a cam extending from the adjustable clamp member below the support bracket and having a substantially smooth, rather than serrated engaging surface. The cam extends toward the stationary support member and engages with an actuation rod pivotally mounted on the stationary support member. The clamping jaws of the apparatus formed by the clamp and support members are normally held open by the force of gravity due to the overcenter balance of the clamp member. As the actuation rod is manually lowered to slidingly engage the surface of the cam, the adjustable clamp member is caused to rotate about the support bracket to close the jaws of the clamp. In order to lock the jaws of the clamp in place against fabric or apparel supported therebetween, a pawl, formed on the actuation rod is maintained in engagement with a ratchet assembly supported on the platform. Spring means maintains the pawl and ratchet assembly in locking engagement with each other. As the actuation rod is manually lowered, the jaws of the clamp may be locked at any intermediate adjusted position so as to accommodate any size pile of fabric.

The ratchet assembly is pivotally mounted on the platform and includes a ratchet release secured to a lower portion of the ratchet bar. The ratchet release is foot operated, by pushing down, which makes it easier to operate. The ratchet pivots out of engagement with the pawl to permit the jaws to swing open, thus providing a positive release of the jaws of the clamp. The positive release is possible because the ratchet assembly is independent of the cam.

A more complete appreciation of the invention will be readily obtained as the same becomes better understood by reference to the following detailed description when considered in connection with the accompanying drawings.

BRIEF DESCRIPTION OF THE DRAWING

FIG. 2 is a side view of the clamp of FIG. 1 shown with the jaws thereof closed; and FIG. 3 is a side view of the fabric clamp of FIG. 1 shown with the jaws thereof open.

DETAILED DESCRIPTION OF THE PREFERRED EMBODIMENT

Figure 1:
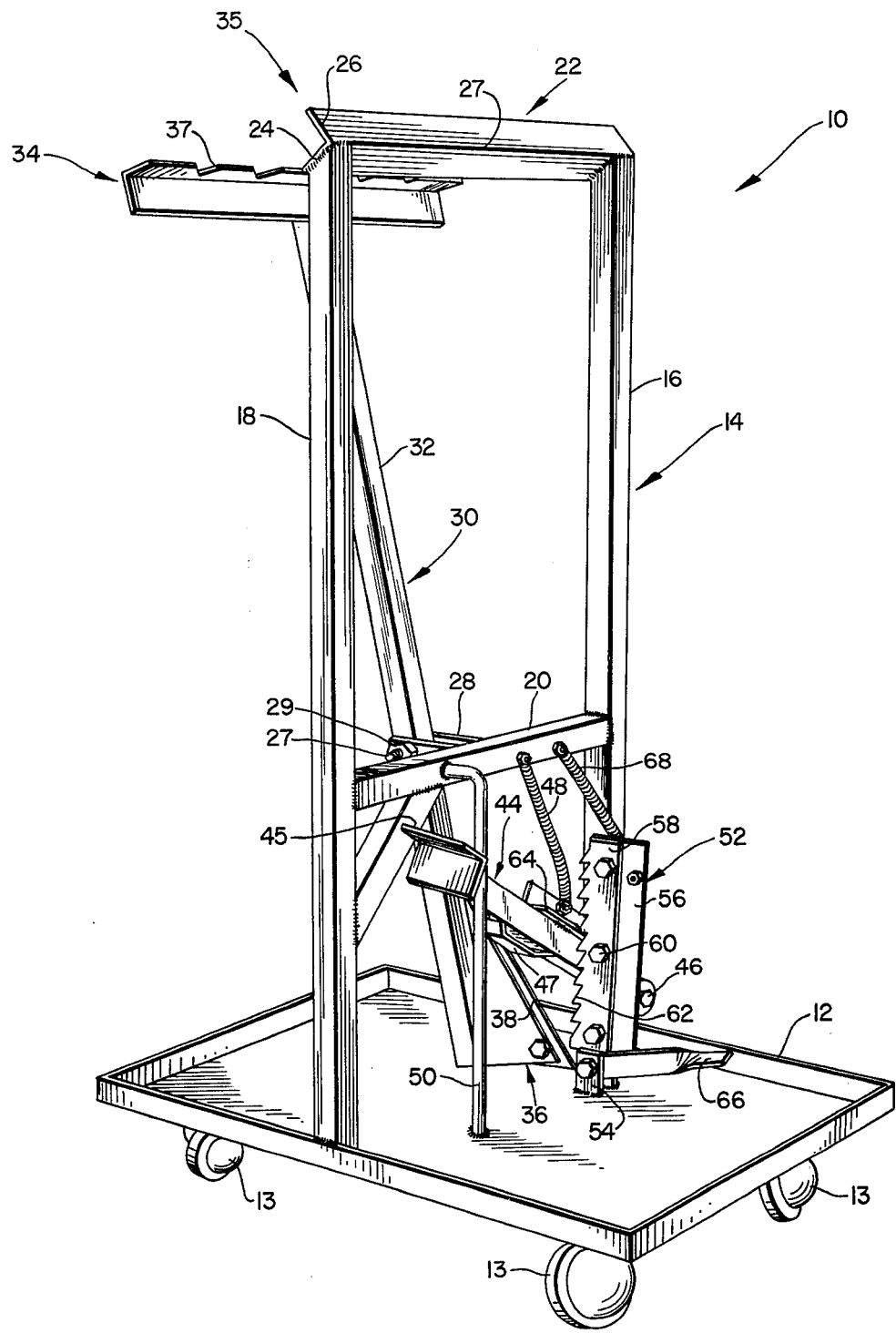
FIG. 1 is a perspective view of the fabric or apparel clamp of the invention.

Referring now to the drawings, wherein like reference numerals designate identical, or corresponding parts throughout the several views, and more particularly to FIG. 1 thereof, an apparatus 10 for clamping fabric or apparel according to the present invention is shown. The apparatus 10 includes a platform 12 supported by a plurality of wheels 13 onto which is vertically mounted a stationary support assembly 14. The support assembly 14 is formed by elongated box frame members 16 and 18 maintained substantially parallel to each other and spaced apart by a bridge member 20 and an end bar 22.

The end bar 22 is formed of an elongated angle member having a cross section which is V-shaped, having two leg portions 24 and 26 formed substantially at right angles to each other and joined at an apex 27. The bar 22 is mounted on the upper ends of the frame members 16 and 18 and is preferably positioned so that the leg portions 24 and 26 form equal angles with a horizontal plane intersecting the apex 27.

A support bracket 28 is welded to the bridge member 20 and pivotally supports an adjustable clamp member 30 formed by a bar 32. A bolt 27 forms the pivot means by extending through apertures in the bracket 28 and correspondingly disposed apertures in the bar 32. A nut 29 is tightened down against the bracket 28 to minimize the amount of play between the bracket 28 and the bar 32, while simultaneously permitting the bar 32 to freely pivot about the bolt 27. The nut may be of a locking type to prevent loosening thereof.

In addition, if desired, a bushing (not shown) made of, for example, teflon or nylon, can be inserted through the apertures in the bar 32 to minimize friction acting on the bar 32 and to space apart the halves of the bracket 28. In such a case, the apertures in the bar 32 are formed large enough to contain the bushing mounted on the bolt 27.

A movable end bar 34 cooperating with the stationary end bar 22 forms a pair of clamping jaws 35. The bar 34 is secured, preferably by welding, to the upper end of the bar 32. It may be formed of an elongated angle member similar to that of the end bar 22 and is positioned to interlockingly engage with the end bar 22, as more clearly seen in FIG. 2. The end bar 34 preferably is provided with a plurality of teeth 37 for gripping fabric against the end bar 22. However, the provision of the teeth is not necessary and could be omitted without departing from the broader spirit of the invention.

Clamp operating cam 36 is secured to the bar 32 at the lower end thereof and extends outwardly toward the support assembly 14. A smooth camming surface is formed on cam plate 38. The plate 38 can be alternatively bolted on, as shown, or permanently secured to the cam, e.g., by welding. The member 38 does not wear out with use so it does not have to be remachined or replaced, as is the case with the serrated cam surface member of the prior art.

An actuation rod 44 having a step 45 is pivotally secured to the frame member 16 with a bolt and nut combination 46 and is disposed substantially parallel to the bridge member 20. As the actuation rod 44 is moved, the rod 44 is constrained to pivot within a vertically orientated plane parallel to the plane of the support assembly 14.

When the actuation rod 44 is in its uppermost or raised position, the clamp member 30 is positioned with the end bar 34 separated from the end bar 22, i.e., with clamping jaws 35 open. The cam 36 is in juxtaposition with actuating follower 47 (FIG. 1) on the actuation rod 44. The clamp member 30 remains in this position under the force of gravity; the clamp member 30 being permanently over-center or top-heavy with respect to the pivot point at which the bar 32 is supported by the bracket 28.

The actuation rod 44 is maintained in its raised position under the force of a spring 48. As the actuation rod 44 is lowered against the force of the spring 48 by the pressure of the operator's foot, the follower 47 provides sliding contact with the cam surface. As the rod 44 lowers, the cam surface on the plate 38 continues to be pushed by the follower 47 shifting the cam 36 to the left (note action between FIGS. 3 and 2). The shifting is characterized by smoothness and the requirement for little force. The shifting of the clamp member 30 ultimately results in closing the jaws 35 of the apparatus (see FIG. 2).

A lateral guide bar 50 is secured to the bridge member 20 and the platform 12. This helps maintain the actuation rod 44 in the above-mentioned vertical plane in sliding engagement with the plate 38 of the cam 36. The guiding also eliminates any chance of binding that might otherwise be created at the bolt 46 by the reverse camming force.

In accordance with an important aspect of the present invention, a ratchet assembly 52 is pivotally mounted to a support bracket 54 on the platform 12. The ratchet assembly includes a ratchet support plate 56, a ratchet bar or plate 58 attached by a plurality of bolts 60, and ratchet release lever 66 fixed to the plates. Teeth 62 of the ratchet assembly bear against a pawl 64 securely mounted, preferably by welding, to the actuation rod 44. During actuation, the pawl 64 slides downwardly over the inclined upper face of each tooth 62 in succession. The teeth thus automatically snap, each in turn, into positive reverse blocking or holding relationship of the rod 44.

In operation during release, the foot-operated ratchet release lever 66 is pressed by a relatively light force to cause the tooth that is holding to disengage from the pawl 64. A tension spring 68 connected between the bridge member 20 and the support plate 56 of the ratchet assembly maintains the teeth 62 in engagement with the pawl 64 prior to the release.

The required force for release of the clamp is light since only the force of the spring 68 and the sliding friction of the bottom face of a single tooth need be overcome. There is no intense gouging of a follower against a serrated surface, as in the prior art. The mating camming surfaces are entirely smooth so that virtually no frictional resistance is added by these parts, and there is thus no erratic movement. The ratchet assembly 52, being independent of the cam, contributes substantially to these results and advantages.

When the operator's foot is removed from the release lever 66, the ratchet assembly 52 returns to engage the pawl 64, now in its uppermost position, under the force of the spring 68. The jaws 35 remain open until the actuation rod 44 is again manually lowered by the operator.

FIG. 2 shows a side view of the clamping apparatus 10 of the present invention with the jaws 35 closed to secure fabric or apparel (not shown) therebetween. The actuation rod 44 is shown in its lowest position bearing against the lower end of the surface of the cam 36. The adjustable clamp member 30 is closed against the support member 14. In practice, the jaws 35 are not generally completely closed but rather are maintained somewhat open due to the thickness of the clamped fabric or apparel.

The resiliency of the fabric assures that the spaced ratchet teeth 62 do not limit the holding effectiveness of the clamp 35 to stepped increments of stacked material. That is, for any given thickness of a stack, a range of pressures may be applied sufficient to securely hold the fabric, as desired. Under these conditions, there is at least one locked position that securely holds. This optium position is readily learned by the operator through feel of pressure against the foot during actuation.

In FIG. 3, the apparatus is shown with the ratchet release lever 66 actuated by being depressed or pushed downwardly by a foot of the operator to free the pawl 64. The stack of material is removed by the operator holding it in his hands as the release is activated. To make this an easy operation, the clamp member 30 is positively pivoted by gravity to its open position due to the over-center or top-heavy mounting of the bar 32. In this position, the follower 47 on the actuation rod 44 is still engaged by the cam 36 and thus serves as a limit to the opening movement.

To briefly review the operation, the operator positions a stack or portion of fabric pieces or apparel between the jaws 35 of the clamp 10. The upper edges of the stacked material are positioned to extend downwardly between the support member 14 and the clamp member 30, i.e., between the jaws 35, while the remaining fabric extends over the top of the end bar 22 and downwardly along the support member 14. The operator now closes the jaws of the apparatus to clamp the fabric or apparel by lowering the actuation rod 44. The pawl 64 establishes locking engagement with the teeth 62 of the ratchet assembly 52. The operator then performs whatever operation is necessary on the fabric. If the fabric or apparel must be transferred between sewing stations, the entire apparatus, including the clamped fabric or apparel, is simply wheeled from station-to-station.

When all operations desired are completed, the operator, while holding the fabric, depresses the ratchet release 66 by foot. This action causes the ratchet assembly 52 to positively pivot away from the pawl 64, the jaws 35 open and the fabric is thus released.

It should be emphasized that the ratchet assembly 52 in cooperation with the pawl 64, actuation rod 44 and the smooth cam surface of plate 38 provides a jaw locking mechanism which is easily engageable and disengageable due to the small amount of friction. However, the locking function is reliable due to the engagement between the pawl 64 and the teeth 62 of the ratchet assembly. Also the clamp is positively releasable due to gravity acting on the clamping member 30.

In summary, a clamp for fabric or apparel is provided with an improved locking mechanism to securely lock the jaws of the clamp against the fabric or apparel. The pawl and ratchet assembly provide a positive locking of the jaws against the fabric or apparel and a quick release therefrom. Because positive locking by means of the pawl and ratchet is provided in lieu of frictional engagement between the actuation rod and the serrated surface of the cam as was heretofore provided, the locking mechanism of the present invention does not wear out with continued use. Accordingly, the jaws of the clamp are not subject to suddenly flying open during use. Furthermore, because the surface of the cam along which the follower on the actuation rod slides is smooth, the jaws are easily closed and locked. The prior art requirement of prying up the actuation rod to release the jaws is also completely obviated. As a result, operators without great strength can use the apparatus without difficulty.

Obviously, many modifications and variations of the present invention are possible in light of the above teachings. It is therefore to be understood that the invention may be practiced otherwise than as specifically described herein, as set forth in the appended claims.

What is claimed is:

1. An apparatus for clamping and supporting apparel such as trousers comprising:
   a stationary support member;
   an adjustable clamp member;
   means for mounting said clamp member for relative movement with respect to said support member to define a pair or jaws, said clamp member including a cam having an operative surface extending toward said support member;
   an actuation rod movable in sliding engagement with said cam surface to cause said clamp member to move with respect to said support member; and
   ratchet means independent of said cam for locking said adjustable member into a position with respect to said support member.

2. The apparatus of claim 1 wherein said support member is mounted on a platform.

3. The apparatus of claim 2 wherein said platform is supported by wheel means.

4. The apparatus of claim 2 wherein said ratchet locking means includes a pawl and ratchet assembly, said pawl being attached to said actuation bar and said ratchet assembly being mounted on said platform.

5. The apparatus of claim 4 wherein said ratchet locking means further includes a foot operated ratchet release, said ratchet assembly being pivotally supported on said platform.

6. The apparatus of claim 2 wherein said stationary support member is vertically mounted on said platform.

7. The apparatus of claim 2 wherein said mounting means includes a pivot means for supporting said adjustable clamp member.

8. The apparatus of claim 7 wherein said pivot means is connected to said stationary support member.

9. The apparatus of claim 3 including a guide bar secured between said stationary support member and said platform for guiding said actuation rod along said cam surface in said adjustable clamp member.

10. The apparatus of claim 1 wherein said support member and said clamp member include a first and a second end bar, respectively, each of said end bars having a substantially V-shaped cross section, said end bars being interlockingly arranged for gripping fabric therebetween.

11. The apparatus of claim 10 wherein each of said end bars comprises two elongated legs joined at an apex to form a substantially right angle.

12. The apparatus of claim 11 wherein one leg of the end bar on said adjustable clamp member seats against the apex of the end bar on the stationary clamp member when said jaws are closed.

13. The apparatus of claim 11 wherein said one leg includes a plurality of teeth for securing said fabric between said end bars.

14. The apparatus of claim 1 including spring means effective for maintaining said adjustable clamp member in clamping position and in locking engagement with said locking means.

15. The apparatus of claim 14 wherein said spring means includes a first spring connected between said actuation rod and said stationary support member, and a second spring connected between said stationary support member and said locking means.

16. The apparatus of claim 1 wherein said actuation rod is pivotally supported on said stationary support member.

* * * * *